United States Patent [19]
Sanders

[11] Patent Number: 6,019,115
[45] Date of Patent: Feb. 1, 2000

[54] SAFETY EXCESS FLOW VALVE SYSTEM WITH ADJUSTABLE CLOSING FLOW RATE SETTINGS

[75] Inventor: R. Gene Sanders, Carmichael, Calif.

[73] Assignee: Sanders Valve Corporation, Fairfax, Va.

[21] Appl. No.: 08/995,009

[22] Filed: Dec. 19, 1997

[51] Int. Cl.[7] .................................................. F16K 17/30
[52] U.S. Cl. .......................... 137/10; 137/460; 137/517; 137/530
[58] Field of Search .................................. 137/504, 517, 137/523, 524, 530, 460, 10

[56] References Cited

U.S. PATENT DOCUMENTS

| | | |
|---|---|---|
| 2,668,555 | 2/1954 | Bartolat . |
| 3,234,961 | 2/1966 | Arnes ........................................ 137/517 |
| 3,794,077 | 2/1974 | Fanshier . |
| 3,807,442 | 4/1974 | Sumner et al. . |
| 4,049,016 | 9/1977 | Henry . |
| 4,093,001 | 6/1978 | Sandin . |
| 4,188,971 | 2/1980 | Otteson . |
| 4,305,566 | 12/1981 | Grawunde . |
| 4,306,585 | 12/1981 | Manos ................................... 137/517 X |
| 4,318,530 | 3/1982 | Lissmyr et al. . |
| 4,345,428 | 8/1982 | Cook ..................................... 137/517 X |
| 4,383,549 | 5/1983 | Maldavs . |
| 5,097,864 | 3/1992 | Myers et al. . |
| 5,136,774 | 8/1992 | Neff . |
| 5,462,081 | 10/1995 | Perusek et al. . |
| 5,465,751 | 11/1995 | Newton . |
| 5,613,518 | 3/1997 | Rakieski . |

FOREIGN PATENT DOCUMENTS

| | | |
|---|---|---|
| 677960 | 9/1966 | Belgium . |
| 1026591 | 3/1958 | Germany . |
| 73 18 404 | 11/1985 | Germany . |
| 06288488 | 11/1994 | Japan . |
| 140689 | 4/1920 | United Kingdom ...................... 13/517 |

*Primary Examiner*—Stephen M. Hepperle
*Attorney, Agent, or Firm*—Dickinson Wright PLLC

[57] ABSTRACT

The present invention relates to an excess flow valve system having a sliding poppet within a chamber with an orifice at one end, wherein the closing flow rate settings can be adjusted. Precise adjustments can be made externally by turning a threaded member extending through the valve, which causes a retainer, threadably located on the member, to move laterally within the chamber. This movement causes an angled surface on the retainer to engage and slide in relation to a similarly angled surface on the poppet. As the poppet is urged toward the retainer by a coiled spring, the poppet is moved longitudinally within the chamber, either toward or away from the orifice. Turning the threaded member enables the maximum travel distance of the poppet, and therefore, the threshold flow rate of the valve, to be precisely set. Additional means for broadening the range of settings, without replacing the spring or changing the orifice size, can also be provided, such as spacers to change the spring tension and multiple phase settings on the valve housing.

31 Claims, 13 Drawing Sheets

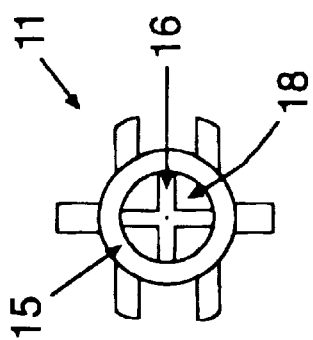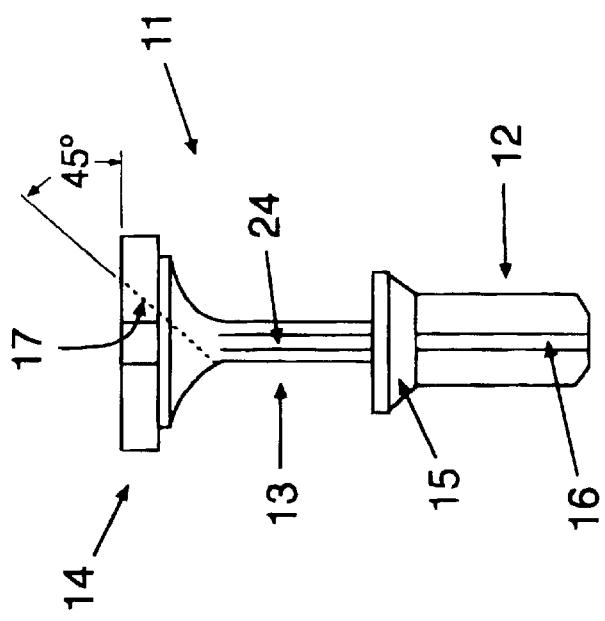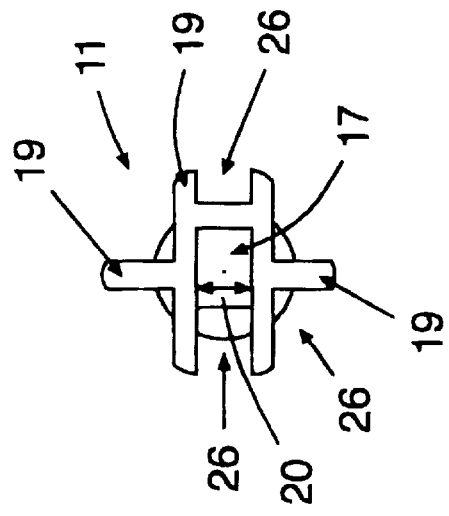

SAFETY EXCESS FLOW VALVE SYSTEM WITH ADJUSTABLE CLOSING FLOW RATE SETTINGS

BACKGROUND OF THE INVENTION

I. Field of the Invention

The present invention relates generally to the field of excess flow valves used to regulate and prevent excess flow of fluid or gas therethrough. More particularly, the present invention relates to excess flow valves which prevent the flow of fluid or gas through a port if the flow rate exceeds a predetermined threshold level.

II. Description of the Related Art

The use of excess flow valves is fairly standard in the gas industry. These valves are commonly used in gas delivery systems. The valves are intended to regulate the flow of gas, vapor, or fluid therethrough by limiting the flow rate to a predetermined maximum rate. If the flow rate exceeds the predetermined rate, indicating a malfunction or dangerous condition, such as in the event of damage or rupture of a hose, pipe or fitting, the valve will shut down the flow of fluid or gas automatically to prevent excessive discharge of the fluid or gas.

Typically, a gas supply system comprises a bottle or utility gas line, or other high pressure gas source, connected directly or through a pipe, or similar gas delivery means, to a regulator unit. The regulator unit supplies the gas at a low pressure rate to its final destination—e.g. a kitchen oven. The excess flow valve is typically placed at the low-pressure end of the regulator unit. The purpose of the excess flow valve is to interrupt the gas supply should a failure occur in the pressure regulator, or in any of the connecting parts such as a hose or pipe.

A typical excess flow valve comprises a sliding poppet inside a chamber capable of closing an opening in the chamber, and preventing the flow of fluid or gas therethrough. A spring is often used to urge the poppet to its open position away from the opening. As the flow rate reaches or exceeds the maximum rate, such as the rate allowed by the size of the opening and/or spring tension, the increase in pressure differential causes the poppet to slide toward the opening, against the tension of the spring, to regulate or close the valve. The difficulty, however, of using standard excess flow valves is that they cannot be adjusted and therefore cannot be used where the fluid or gas supply pressures and threshold flow rates may vary, without changing the valve.

Certain types of externally adjustable valve systems have been used in the past to enable systems to be adjusted to different flow rates and pressures without having to substantially replace critical components each time an adjustment is made. Such adjustment capabilities are designed to alleviate the difficulty of having to replace internal components, such as the spring, or change the size of the opening, each time different flow rates and pressures are encountered. These adjustable valve systems, however, have not been altogether satisfactory, in that they are not specifically designed to provide a wide range of adjustments, nor to allow the valves to be precisely set in circumstances where sensitivity to pressure changes might be needed.

An excess flow valve having limited adjustment capability is disclosed in the Sumner et al. patent, U.S. Pat. No. 3,807,442 (the "Sumner patent"). The Sumner patent provides an excess-flow check valve comprising a poppet member and a retainer member with an external adjustment capability. The distance between the poppet member and an orifice determines the flow area for the fluid passing through the valve. By varying the flow area, the differential pressure established by the fluid flow therethrough varies inversely (i.e., as the flow area decreases, the differential pressure increases). In one embodiment, the Sumner patent employs a cam member which, upon rotation, adjusts the distance between its poppet member and an orifice. The ability to adjust said distance, however, is limited by the preselected settings provided on the cam member, i.e., lobes and flats. That is, for any given application, the shut off rate determined by the cam member might be much greater than the combined requirements of the appliances connected to the gas line, which could allow substantial dangerous flow to occur without actuation of the valve. The valve also fails to accommodate for a wide range of flow rate levels which might be needed.

Another type of externally adjustable valve referred to as a velocity fuse for a hydraulic line is shown in the Maldavs patent, U.S. Pat. No. 4,383,549 (the "Maldavs patent"). The Maldavs fuse includes a poppet valve assembly having an adjustment screw extending into an internal shielded body. The shielded body helps to divert the flow of fluid away from the poppet body so that only the poppet head is exposed to the fluid flow. The internal components of the shielded body also help to dampen the movement of the poppet so that it does not react quickly to slight changes in line pressure such as those created by short term surges. An adjustment screw used in conjunction with a dampened poppet does not normally provide much sensitivity to flow pressure changes.

In view of the limitations of the prior art, the excess flow valves disclosed in Sumner and Maldavs, and other similar valves, exhibit only a limited or crude adjustment capability. In Sumners, for example, the sensitivity of the valve depends on limited preset threshold flow rate levels, and in Maldavs, the adjustment screw moves laterally and rotates against a freely rotating poppet which makes precise adjustments difficult. These excess flow valves also fail to accommodate for a wide range of flow rate levels. Accordingly, there is a need for an excess flow valve which is sensitive to virtually any desired threshold flow rate. Moreover, the threshold flow rate for such excess flow rate valves should be easily adjustable to accommodate for a wide range of fluid or gas supply pressure.

SUMMARY OF THE INVENTION

The present invention provides an excess flow rate valve system and method for regulating the flow of fluid, vapor or gas therethrough. According to the present invention, the excess flow rate valve is adjustable to actuate within a wide range of flow rates. The valve system is designed to shut down the flow of the fluid, vapor, or gas if the flow rate exceeds a predetermined flow rate (the "Threshold Rate"). The valve system is responsive to virtually any Threshold Rate, thereby accommodating a wide range of fluid or gas supply pressure. At the same time, the valve system is precisely and accurately adjustable within said wide range such that it can be applied to virtually any application, such as low pressure applications, where extreme sensitivity to pressure changes might be needed. Moreover, the valve system prevents the flow of the fluid or gas in the event of a break in a fuel line, hose, or pipe resulting from a catastrophic event such as an earthquake, flood, explosion, or a similar event. In such an event, the excess flow valve system shuts down the supply of fluid or gas substantially completely, except for a minimal allowable back pressure.

The valve system will not restore the flow of the fluid or gas until the break in the fuel line, hose, or pipe is repaired.

The preferred embodiment of the present invention relates to an excess flow valve which prevents the flow of gas, such as natural gas, and other vapors, through a port if the flow rate exceeds the predetermined threshold level. While the valve can be used in conjunction with fluids, the preferred embodiment of the present valve is specifically intended to be used to prevent excess flow of natural gas and/or liquid petroleum gas vapors through a pipe or similar gas delivery means under low pressure in the event of a leak or catastrophic failure.

The preferred valve comprises a sliding poppet within a chamber which can be actuated to close an orifice when the flow rate exceeds the threshold level. The orifice allows the flow of gas from one end to another. A coiled spring is used to urge the poppet away from the orifice under flow rates that are less than the excess level. An adjustment mechanism is provided for setting the maximum distance the poppet can travel in relation to the orifice. By precisely controlling the position of the adjustment mechanism, it is possible to accurately adjust the threshold level without having to change the tension of the spring, modifying the orifice size, or the like. At the same time, the repeatability of the valve's operation at the desired rates is provided.

The adjustment mechanism comprises a threaded member extending through the chamber and an adjustment cam located thereon. The threaded member is externally adjustable and preferably perpendicular to the longitudinal travel direction of the poppet. The cam is provided on the threaded member and can be moved laterally in relation to the chamber and longitudinally in relation to the threaded member. On the cam is an angled engagement surface adapted to slide in relation to a similarly angled engagement surface on the poppet top. By turning the threaded member and moving the cam laterally, therefore, the adjustment cam's engagement surface slides against the poppet's engagement surface, and, by virtue of the spring urging the poppet toward the cam, causes the poppet to move either toward or away from the orifice. The pressure applied by the spring urges the poppet's engagement surface toward the cam's engagement surface, wherein the cam retains the poppet's movement and determines the maximum travel distance thereof.

The spring keeps the poppet in its open position against the cam until the flow rate exceeds the threshold level, in which case the increase in pressure differential acts upon and causes the poppet to move to its closed position. Precisely controlling the maximum travel distance of the poppet in relation to the orifice, i.e., the Threshold Rate, enables the valve to be substantially infinitely adjustable within its operating range and highly sensitive to flow rate changes and pressure differentials from one part of the system to another. Also, in the preferred embodiment, the valve is configured to substantially limit the rotation of the poppet in relation to the cam, thereby helping to keep the angled engagement surfaces in contact with each other, and movable unidirectionally and parallel relative to one another. The top of the poppet is also provided with support arms that extend to the walls of the chamber to stabilize the poppet during adjustment, i.e., turning the threaded member places lateral pressure on the poppet top, while allowing the poppet to slide longitudinally within the chamber.

In addition to the adjustment mechanism discussed above, several other features help to broaden the possible range of threshold levels. First, spacers can be provided to adjust the distance the spring can be compressed for any given travel distance between the poppet and orifice. Second, the threaded member can be adapted to be positioned on multiple fixed settings located on the valve housing so that the distance between the adjustment mechanism and orifice can be varied. These pre-selected settings enable the adjustment mechanism to be positioned either closer or further away from the orifice, thereby expanding the range of potential threshold rates. The length of the poppet can also be varied to expand the range if needed. The valve also contemplates using a tamper resistant break-away plug to cover the head of the threaded member after the setting is made. After the threaded member is turned and the proper adjustments are made to set the threshold flow rate, the plug can be used to cover the head to prevent unauthorized adjustments.

BRIEF DESCRIPTION OF THE DRAWINGS

The above and other aspects, features and advantages of the present invention will be more apparent from the Detailed Description of the Invention section presented in conjunction with the following drawings, in which:

FIGS. 4a, 4b and 4c show a top view, side view and bottom view, respectively, of an exemplary configuration of a poppet with an angled engagement surface and support arms used in the excess flow valve of the present invention;

DETAILED DESCRIPTION OF THE PREFERRED EMBODIMENT

Figure 1:
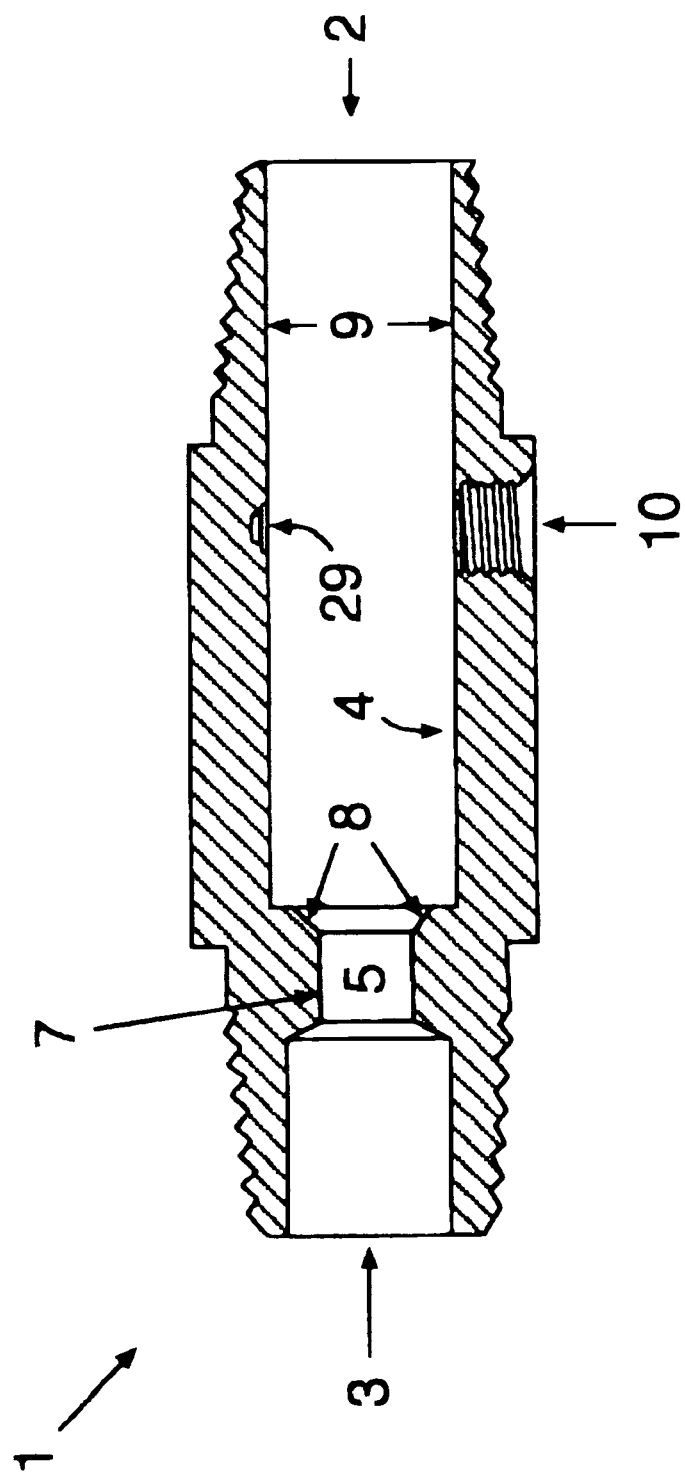
FIG. 1 shows a longitudinal cross-section of an exemplary configuration of the body of the excess flow valve used in the present invention.

With reference now to the drawings, the present invention provides an excess flow valve system and method to regulate the flow of fluid, vapor, or gas therethrough. In the first embodiment, the valve system comprises a single-chamber housing body 1, as shown in FIG. 1, having an upstream end 2 and downstream end 3, wherein inside the housing body is a chamber 4 with an orifice 5 at one end. The orifice 5 is formed in a narrow portion 7 of the housing body 1 through which fluid or gas can pass from one end 2 to the other 3. The narrow portion 7 has a receiving portion 8 adjacent the wider portion 9 of the chamber 4 for receiving the poppet seat 15, as will be discussed. The body 1 is preferably externally threaded on each end 2 and 3 so that it can be secured to a threaded pipe system, such as those used in gas distribution systems.

Figure 6B:
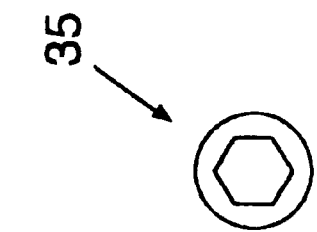
FIGS. 6a and 6b show a side view and end view, respectively, of an exemplary configuration of a threaded member used in the excess flow valve of the present invention.
Figure 6A:
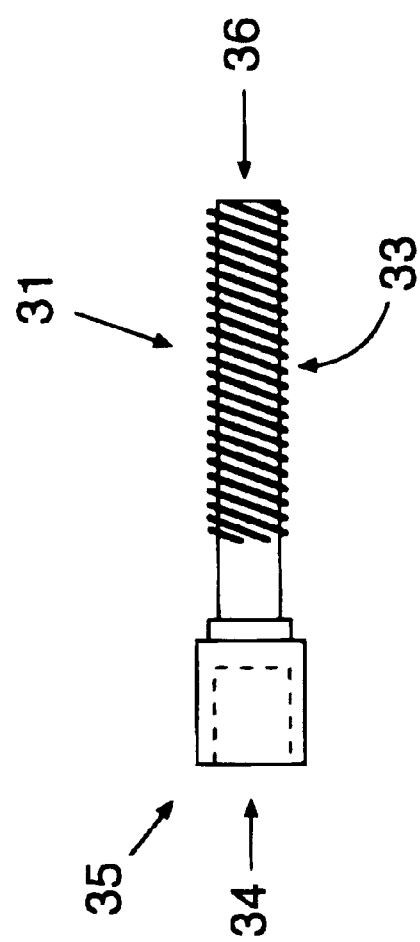

The body 1 has an opening or bore 10 through which a threaded member 31, as shown in FIG. 6a, can be inserted laterally into the chamber. In other embodiments, multiple bores can be provided, as will be discussed, to enable the location of the threaded member 31 in relation to the body 1 to be changed. Directly on the other side of the chamber 4 on the inside wall of the wider portion 9, as shown in FIG. 1, is a notch 29 associated with the bore 10 such that the threaded member 31 can be extended through the chamber 4 and into the notch to secure the member to both sides of the body 1. It should be appreciated that other means for supporting the threaded member 31 can be used that are within the contemplation of the present invention. The housing body 1 is preferably made of a strong, rigid, airtight material such as steel, composite material, hardened plastic, etc., and can be manufactured in any conventional manner.

Figure 3:
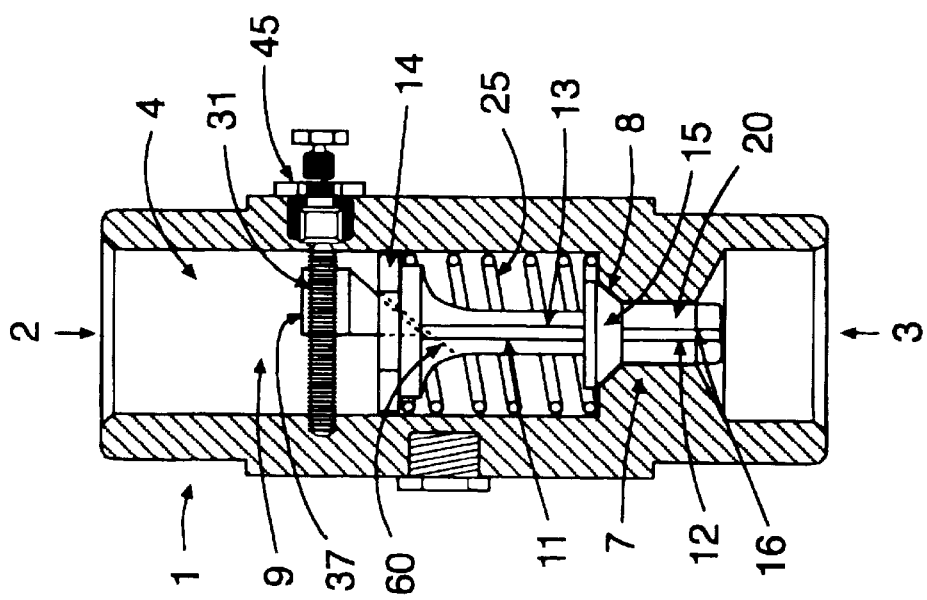
FIG. 3 shows a longitudinal cross-section of an exemplary configuration of the excess flow valve of the present invention in its closed position, wherein the cross-section is normal to the cross-section of FIG. 2.
Figure 2:
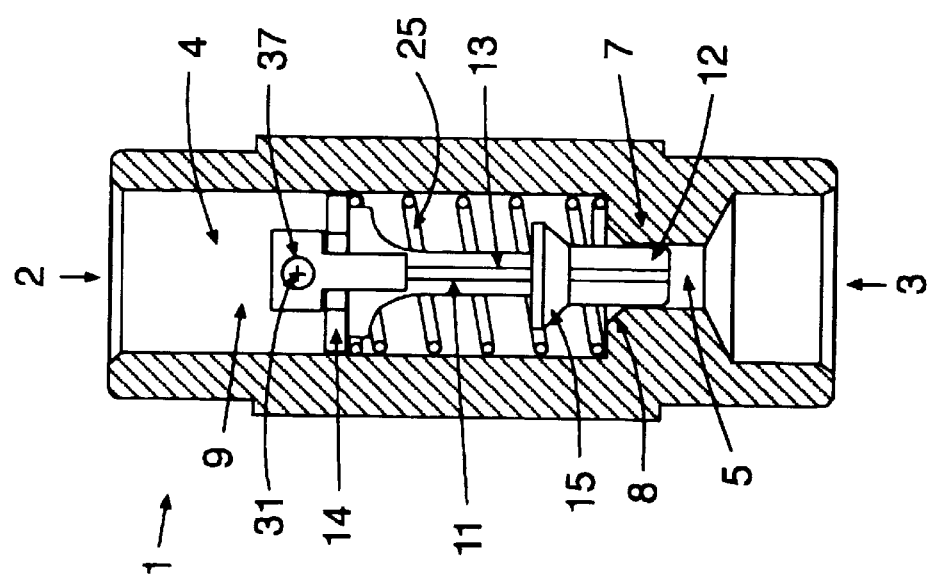
FIG. 2 shows a longitudinal cross-section of an exemplary configuration of the excess flow valve of the present invention in its open position, wherein the cross-section is normal to the cross-section of FIG. 3.

Within the chamber 4, as shown in FIGS. 2 and 3, is a sliding poppet 11 and a coiled spring 25 extending in the longitudinal direction in relation to the axis of the housing body 1. The poppet 11 and spring 25 are preferably co-axially oriented within the chamber 4 with the spring preferably on the outside near the perimeter of the chamber and the poppet extending relatively inside the spring. The inside wall of the chamber 4 is preferably cylindrical to allow the spring and poppet within the chamber 4 to slide without obstruction. The spring 25 is preferably situated in the chamber 4 such that its lower end 30 is pressed against the narrow portion 7 of the chamber 4 and its upper end 28 extends toward the poppet top 14. The upper end 28 of the spring 25 preferably cooperates with the poppet top 14, such that the spring urges the poppet 11 away from the orifice 5. The spring 25 can be any conventional type, i.e., made of metal, and can be provided with a pre-calibrated tension, as is known in the art.

The poppet 11 is generally configured to slide within the chamber 4, preferably inside the spring 25. The poppet 11, shown in FIGS. 4a, 4b and 4c, preferably has a lower flange portion 12 with four fins 16 extending therefrom, a valve seat 15 adapted to seal the orifice 5, an extended shaft portion 13, and a poppet top 14. The lower flange portion 12 is adapted to slide within the orifice 5 and be positioned in relation to the chamber so that the poppet 11 can slide in a longitudinal direction guided by the fins 16. The poppet seat 15 extends outward at the top of the flange portion 12 and is preferably configured to substantially mate with the receiving portion 8 such that, in its closed position, as shown in FIG. 3, the poppet seat 15 seals the orifice 5. The spaces 18 between the fins 16, as shown in FIG. 4c, as well as the distance between the poppet seat 15 and the orifice's receiving portion 8, help determine the flow area through which the fluid or gas can pass from one end 2 to the other 3. The size of the orifice 5, as well as the flow area 18 between the fins 16, therefore, are carefully calibrated to provide the appropriate amount of flow. Above the seat 15 is the shaft portion 13 which is preferably relatively thin to reduce the overall weight of the poppet so that gravity does not substantially affect the performance of the valve. Ribs 24 can be provided along the shaft portion 13 to provide rigidity if desired. By lengthening or shortening the shaft portion 13, or other portions of the poppet, the poppet 11 can be made either longer or shorter, to adjust the threshold flow rate, as the need arises.

The poppet top 14 has one or more support arms 19, as shown in FIGS. 4a–4c. The support arms 19 preferably extend outward laterally to provide support for the poppet 11 in relation to the chamber 4 wall. The support arms 19, in conjunction with the fins 16 on the lower flange portion 12, allow the poppet 11 to slide substantially longitudinally along the axis of the housing body 1. The support arms 19 also brace the poppet against lateral pressure that may be applied to the poppet top 14 as the valve is adjusted. At least four support arms 19 are preferably provided, or any number of arms needed to provide sufficient support in substantially all directions within the cylindrical wall of the chamber 4. The spaces 26 between the support arms 19 must also provide a sufficient flow area, i.e., greater than the flow area of the orifice 5, so that this portion of the chamber does not control the flow rate of the valve. This is also true with respect to all of the components of the valve collectively positioned within the chamber 4. While the support arms 19 are extended far enough to the chamber wall to provide lateral support, they preferably extend to slightly inside the chamber wall to reduce friction between the arms 19 and the inside of the chamber. The poppet top 14, with support arms 19, retains the upper end 28 of the spring 25, either directly, as shown in FIGS. 2 and 3, or in conjunction with a retaining ring, or spacer, applied between the spring and poppet top 14.

Preferably located on the poppet top 14 is the poppet's angled engagement surface 17. The engagement surface 17 is provided along substantially the same incline as the cam's engagement surface 39, located on adjustment cam 37 shown in FIGS. 5a–5c. The location of the engagement surface 17 between two support arms 19 on the poppet top 14 makes it possible for the cam's engagement surface 39 to slide relative to the poppet's engagement surface 17, while fitting between two of the support arms and, at the same time, limiting the rotation of the engagement surfaces 17 and 39 in relation to one another. The width 20 between the two support arms 19 is preferably only slightly wider than the width of the cam's engagement surface 39, so that the relative rotation of the surfaces 17 and 39, and the poppet 11 and cam 37, respectively, to which they are connected, is substantially restricted. The rotation of the poppet 11 in relation to cam 37 is limited so that the engagement surfaces 17 and 39 will remain parallel to one another and slide in a unidirectional manner during adjustments, thereby allowing adjustments to be precisely made. It should be readily apparent that similar support guides can be placed on cam 37 and other portions of the valve to limit the relative rotation between the poppet 11 and cam 37, and that any other means for limiting the rotation of the poppet, such as guides along the chamber or orifice, can also be used.

Extending through the bore 10 located on the body 1, as shown in FIGS. 2 and 3, is the threaded member 31. The threaded member 31, as shown in FIGS. 6a–6b, is preferably a shaft or bolt with external threads 33 along at least a portion of its length. The shaft has a head 35 at one end 34 and terminates at the other end 36. When inserted into the body 1, the terminating end 36 is inserted into the notch 29 on the side of the chamber 4 opposite the bore 10 such that the threaded portion 33 of the shaft extends laterally through the chamber 4 with the member 31 supported by the body 1. The head 35 is positioned such that it can be accessed through the bore 10 from the exterior of the body. The head 35 is preferably an allen head, but can be a screw head, hex head, or any type of head, to enable the threaded member 31 to be turned or rotated within the chamber 4.

Figure 5C:
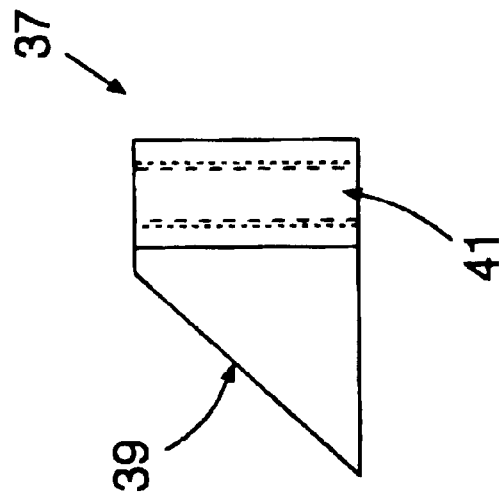
FIGS. 5a, 5b and 5c show an end view, top view and side view, respectively, of an exemplary configuration of an adjustment cam with an angled engagement surface used in the excess flow valve of the present invention.
Figure 5B:
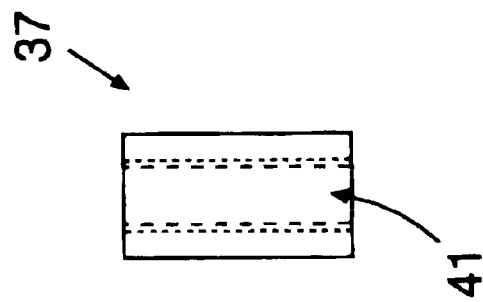
Figure 5A:
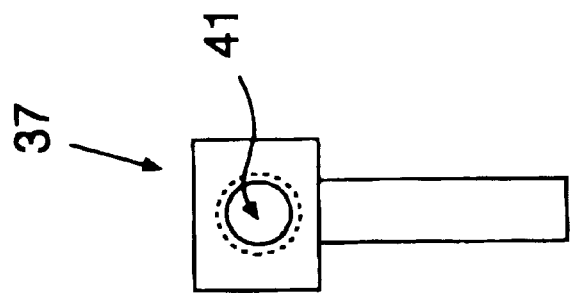

Positioned on the threaded member 31, as shown in FIG. 3, is the cam 37. The cam 37, as shown in FIGS. 5a–5c, has a threaded bore 41 adapted for rotational movement relative to the threaded portion 33 of the member 31. Turning the threaded member 31 causes the cam 37 to move longitudinally thereon and, as shown in FIG. 3, laterally in relation to the chamber 4. The cam's engagement surface 39 extends from the securing portion, and is oriented and adapted to engage and slide parallel with the poppet's engagement surface 17 along substantially the same inclined plane 60, shown in FIG. 3. The angle of the two surfaces 17 and 39 and the inclined plane 60 is preferably about 45 degrees, although any angle which provides for relative movement of the two surfaces in directions normal to each other is possible. When the threaded member 31 is turned and the cam 37 is moved laterally, the two engagement surfaces slide relative to one another, and, with the spring 25 urging the poppet 11 toward the cam 37, the sliding of the two engagement surfaces 17 and 39 causes the poppet's engagement surface 17 and poppet 11 to move in a longitudinal direction, either toward or away from the orifice 5. Since the cam retains the movement of the poppet upward, adjusting the cam 37 in this manner sets the maximum travel distance of the poppet in relation to the orifice 5.

Both the poppet 11, including the poppet top 14, and cam 37, can be made of virtually any strong, resilient material, but is preferably made of a composite such as Delrin™ made by Dupont. The material preferably withstands extreme changes in temperature and humidity and results in the two engagement surfaces 17 and 39 wearing evenly and sliding relatively easily with low friction in relation to one another. The material is also preferably light weight so that the movement of the poppet 11 is only nominally affected by the orientation of the valve. The poppet 11 and cam member 37 can be formed by any conventional method, such as by injection molding.

Figure 7B:
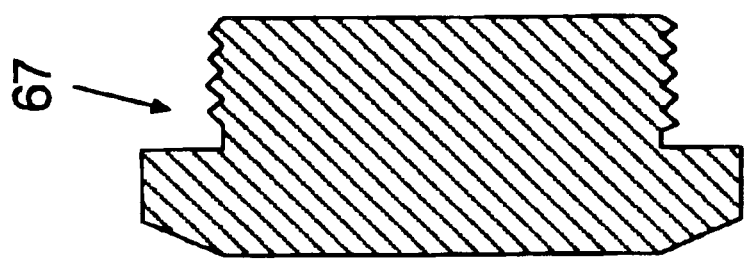
FIG. 7b shows a cross-section view of an exemplary configuration of a sealing cap used in the excess flow valve of the present invention.
Figure 7A:
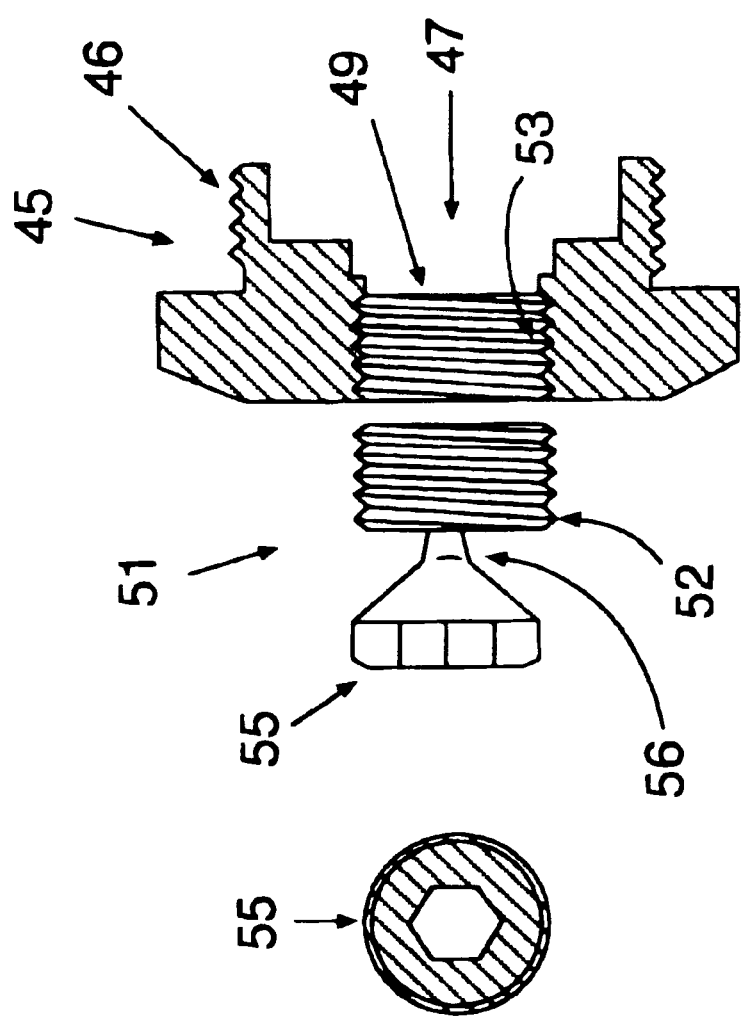
FIG. 7a shows a cross-section view of an exemplary configuration of a cap with a bore on the valve body with a break-away plug used in the excess flow valve of the present invention.
Figure 9:
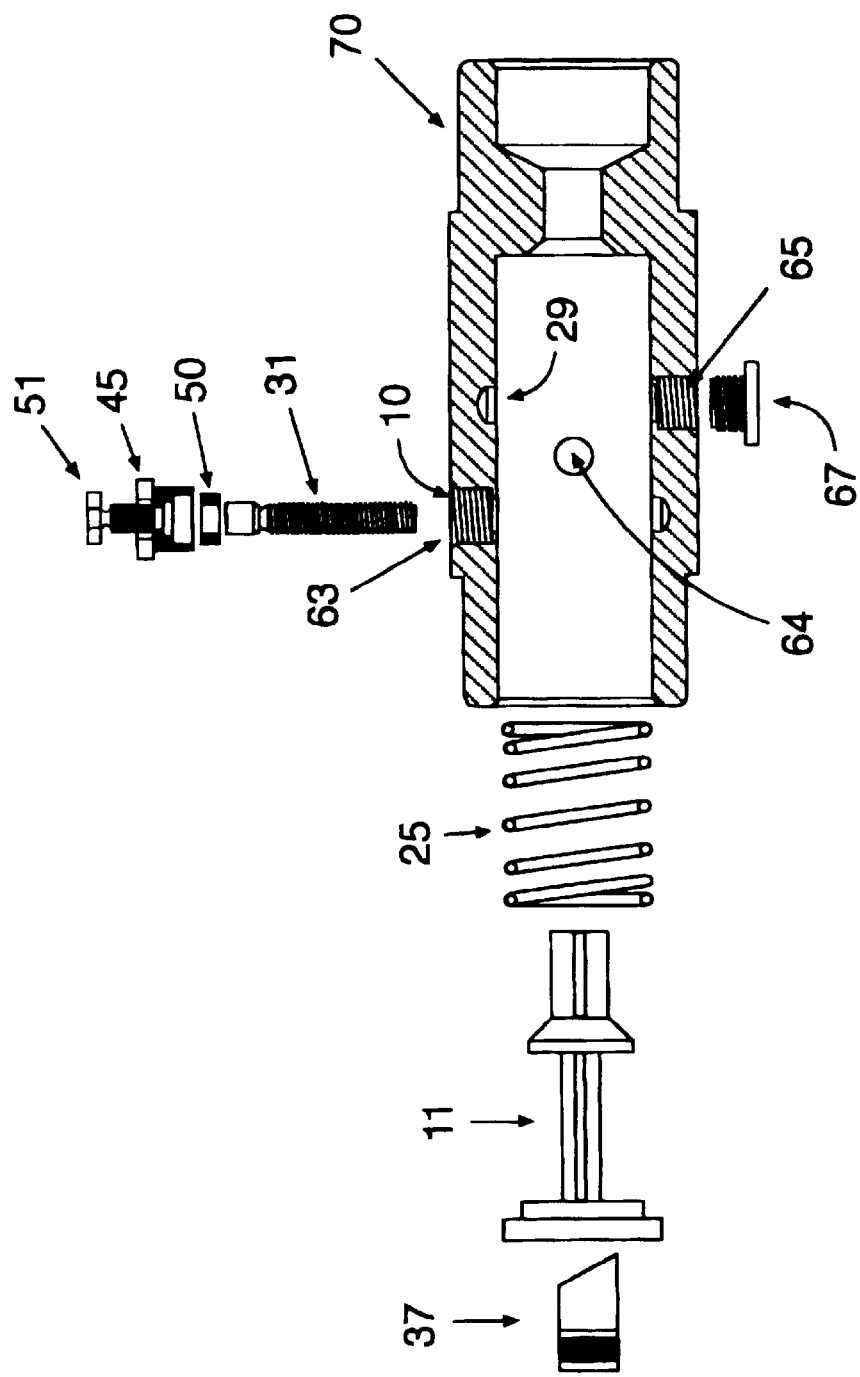
FIG. 9 shows an exemplary assembly having multiple settings with a long poppet and threaded member in the upper setting used in the excess flow valve of the present invention.

A sealing cap 45 is provided, as shown in FIG. 7a, to seal the bore 10. It preferably has external threads 46 to match internal threads on the bore 10, such that the cap 45 can be inserted within the bore and secured thereto to provide an airtight seal. The cap 45 is adapted with a cavity 47 adjacent to which the head 35 can be positioned wherein the cap helps secure the threaded member 31 within the chamber, preventing the member 31 from sliding while allowing it to rotate therein. In the preferred embodiment, an access bore 49 is provided through the cap 45 so that the head 35 of the threaded member 31 can be turned externally, i.e., from outside the body 1. A bushing 50, shown in FIG. 9, is preferably provided within the cavity 47 of the cap 45 to prevent leakage of fluid or gas from the chamber 4 through the access bore 49.

The access bore 49 preferably has internal threads so that a separate break away screw 51 can be inserted therein to prevent unauthorized adjustments of the threaded member 31. The pitch on the threads 52, 53 on the screw 51 and access bore 49, respectively, is preferably customized so that no standard screw can be inserted. The break away screw 51 has a separate head 55, such as a screw head, allen head, hex head, etc., which is adapted to be turned by any conventional means. The head 55 is supported by a thin stem 56 which can be broken off after the valve is set and the screw 51 inserted.

Figure 8B:
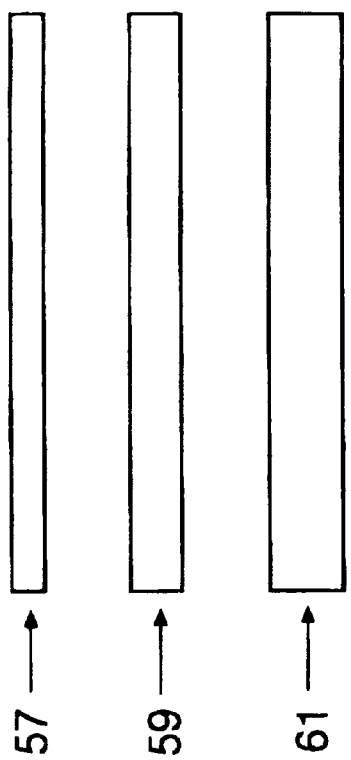
FIGS. 8a and 8b show spacers of various widths that can be used in the excess flow valve of the present invention.
Figure 8A:
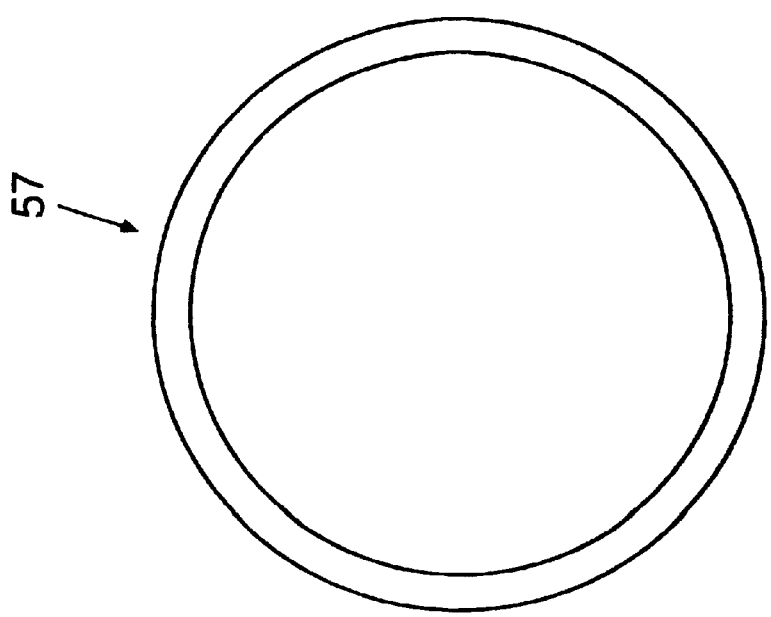
Figure 10:
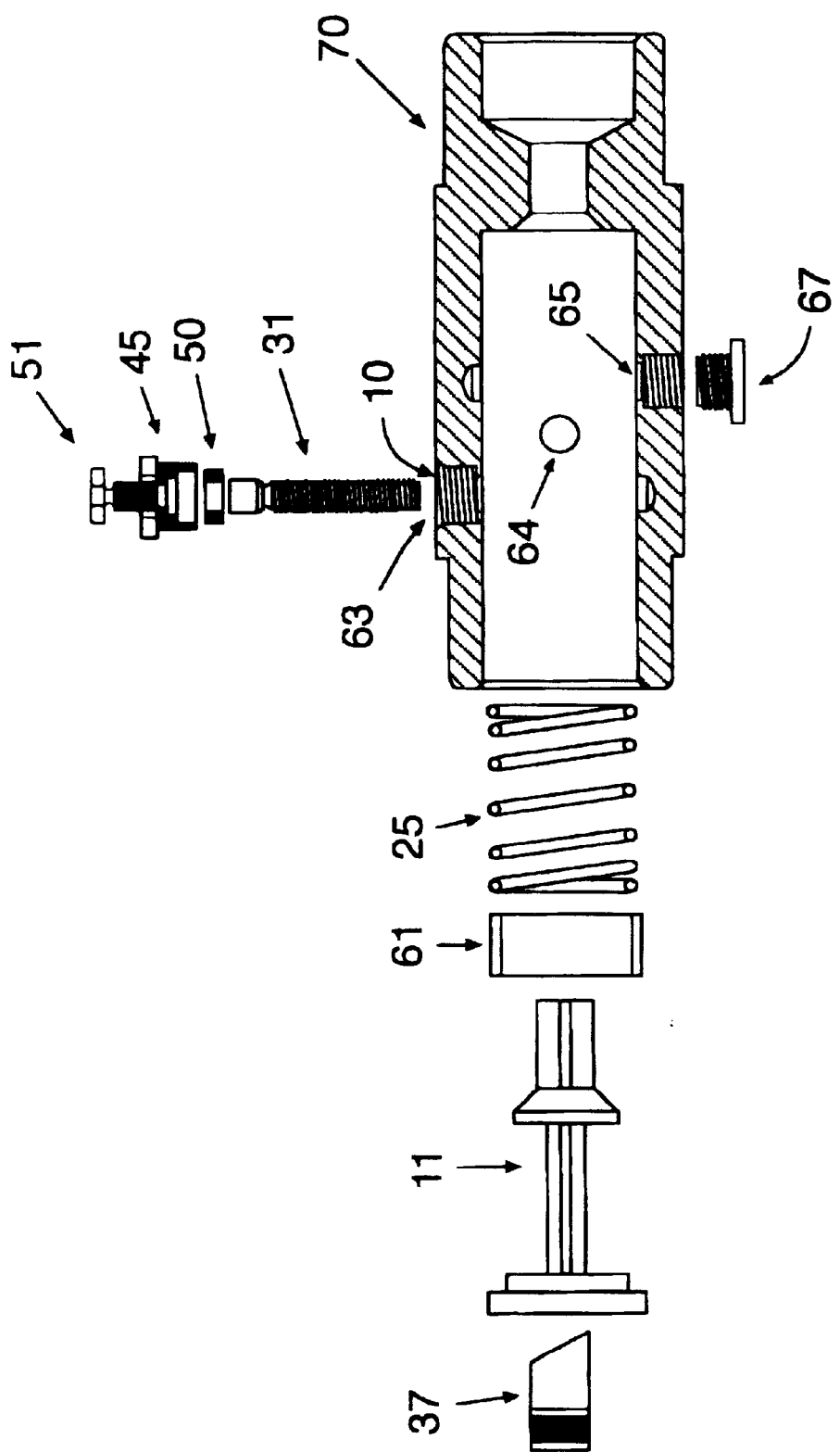
FIG. 10 shows an exemplary assembly having multiple settings with a long poppet, threaded member in the upper setting and one spacer used in the excess flow valve of the present invention.
Figure 11:
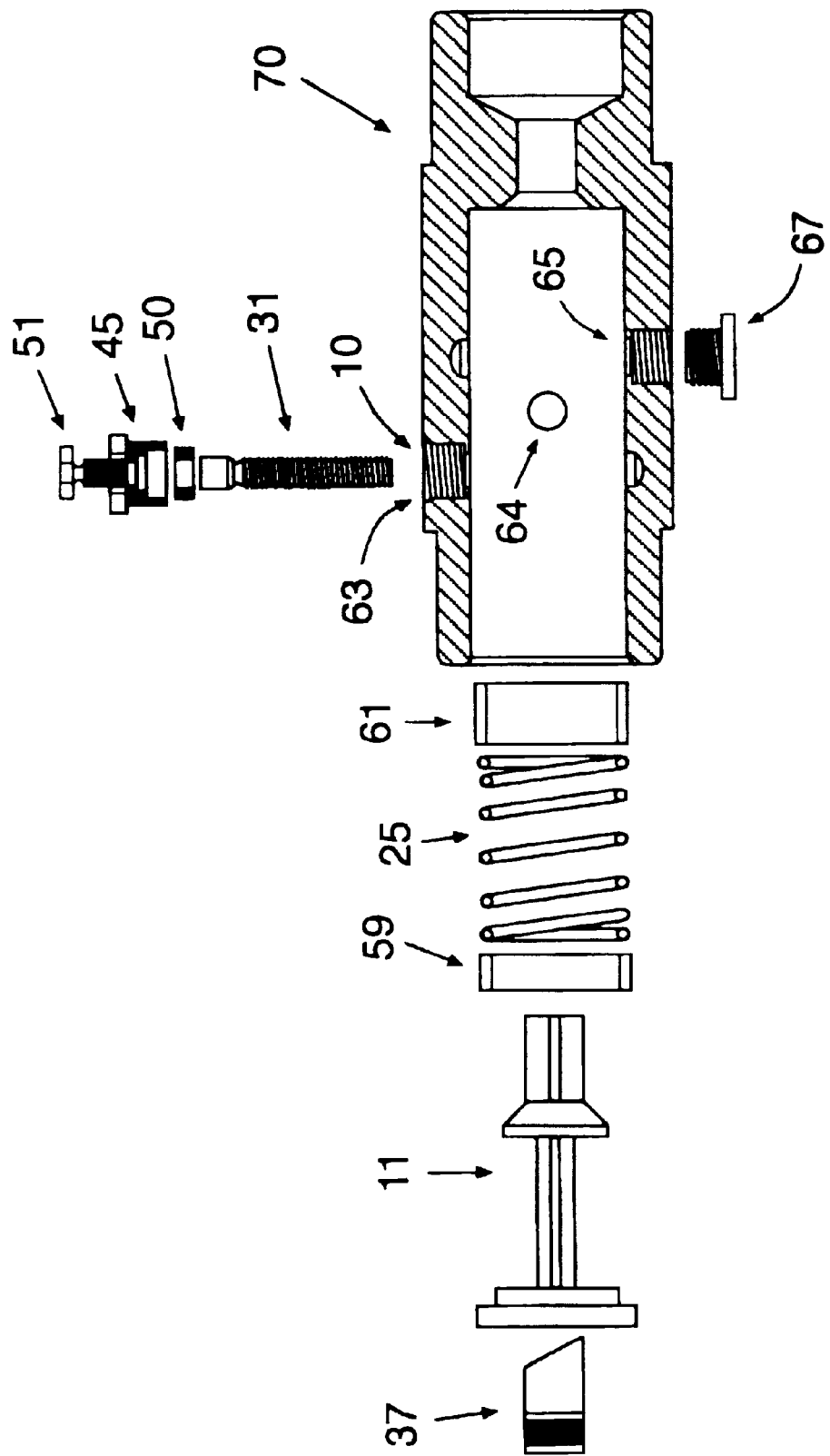
FIG. 11 shows an exemplary assembly having multiple settings with a long poppet, threaded member in the upper setting and two spacers used in the excess flow valve of the present invention.
Figure 12:
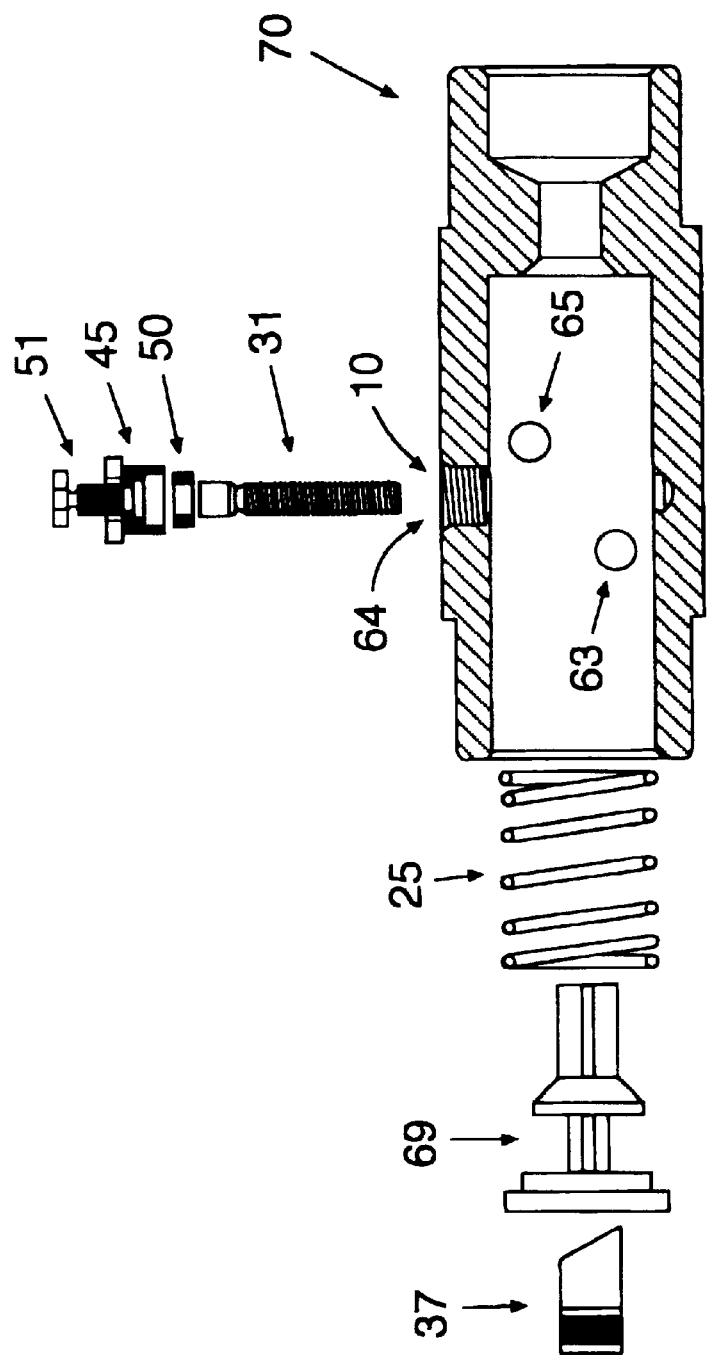
FIG. 12 shows an exemplary assembly having multiple settings with a short poppet and threaded member in the center setting used in the excess flow valve of the present invention.
Figure 13:
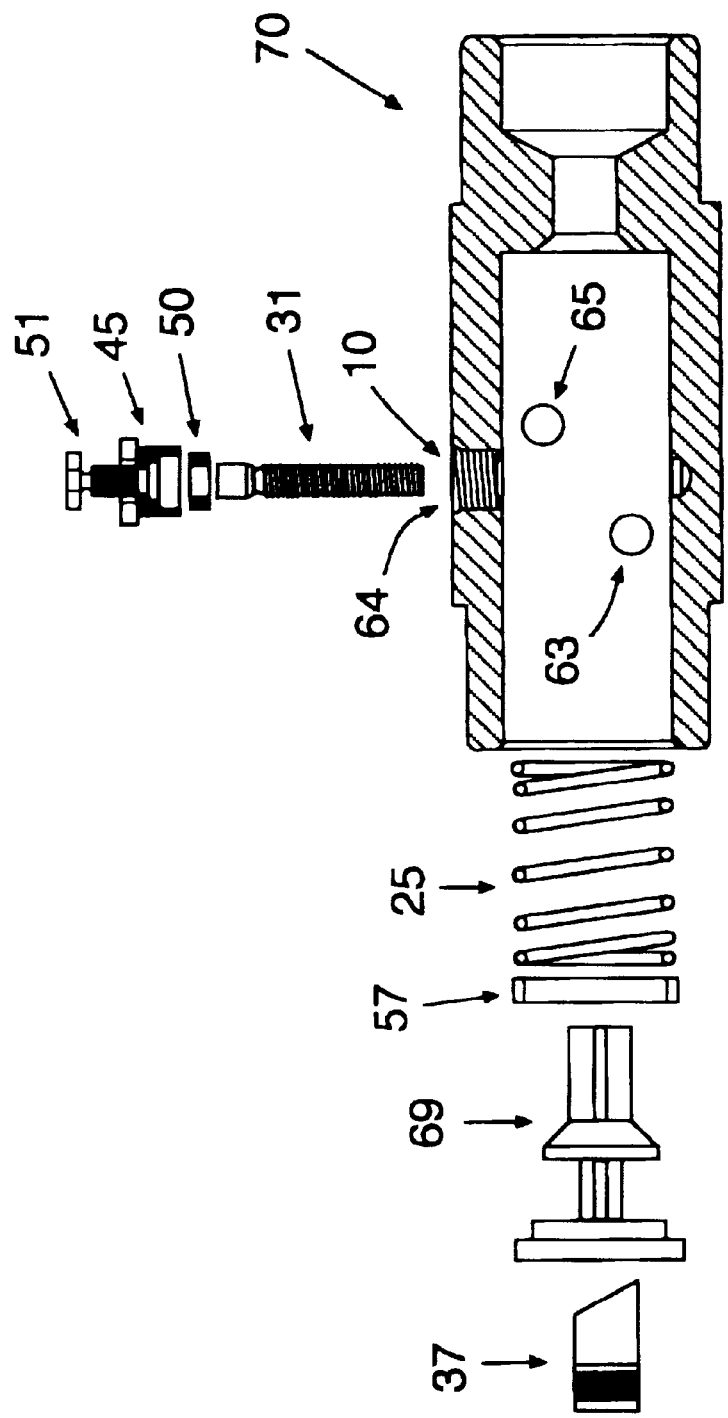
FIG. 13 shows an exemplary assembly having multiple settings with a short poppet, threaded member in the center setting and one spacer used in the excess flow valve of the present invention.
Figure 14:
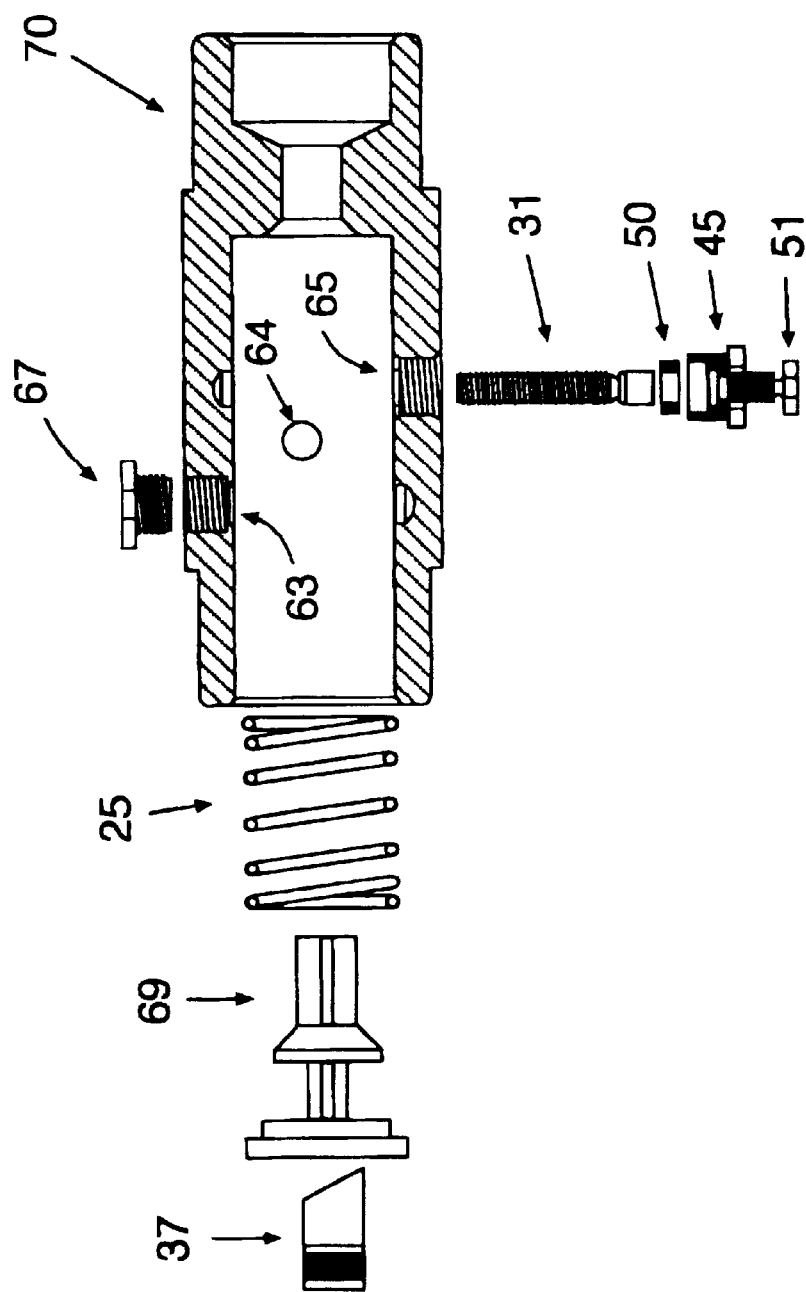
FIG. 14 shows an exemplary assembly having multiple settings with a short poppet and threaded member in the lower setting used in the excess flow valve of the present invention.

Spacers 57, 59 and 61, as shown in FIGS. 8a and 8b, can be provided to widen the range of threshold flow rates. The spacers are preferably annular in shape to match the shape of the spring, although it should be apparent that spacers in virtually any shape can be provided. One or more spacers can be inserted into the chamber adjacent the spring, either on the upper end 28, or lower end 30, or both. The spacers help to adjust the threshold flow rate by compressing the spring and adjusting its tension for any given travel distance of the poppet. Exemplary manners in which the spacers are inserted into the chamber relative to the spring are shown in FIGS. 10, 11 and 13. The spacers 57, 59 and 61 can come in various widths depending on the desired Threshold Rate ranges. Any number of spacers can be provided if desired.

In another embodiment of the present invention, as shown in FIGS. 9–14, the system can be a multi-phase excess flow valve system. The structure and operation of this valve system is similar to the valve system of the first embodiment, except that it has a wider range of Threshold Rates. As substantially shown in FIGS. 9–14, a three-phase housing design 70 is shown to demonstrate the multi-phase excess flow valve system. With the three-phase housing design, three axially-displaced positions 63, 64 and 65, are provided for the threaded member 31. The physical dimensions of other components of the valve system may be adjusted to accommodate for insertion of the threaded member 31 in one of the new positions. For each of the positions, the same coiled spring 25 with a pre-calibrated tension, or different springs, if desired, can be used to cover a wide range of Threshold Rates. Each position comprises a bore and associated notch 29, as shown in FIGS. 9–14, similar to those used in the first embodiment. Each position 63, 64 and 65 is located at a predetermined distance from the orifice 5 to enable the range of threshold flow rates to be expanded. The unused positions may be sealed using threaded plugs 67, as shown in FIG. 7b, to prevent any leak or escape of the fluid or gas from the housing body 1. In conjunction with the fine adjustments that can be made by the adjustment mechanism, the multiple phase design valve system can be used to achieve virtually any desired range of Threshold Rates. Although three positions are illustrated herein, it will be appreciated that 2, 4, 5 or more positions can similarly be provided, depending on the range of desired flow rates and the fineness of the adjustment that is required.

In its open position, the valve system regulates the flow of the fluid or gas from an area on one end 2 to another area at the opposite end 3. To adjust the valve, by rotating the threaded member 31 with the head 35, the cam 37 can be laterally displaced in a direction transverse to the flow direction or to the longitudinal axis of the valve body 1. The cam's engagement surface 39, as discussed, is designed to slide in relation to the poppet's engagement surface 17 along the inclined plane 60. In the embodiment shown in FIGS. 2 and 3, the lateral displacement of the cam 37 along member 31 away from the sealing cap 45, allows the poppet 11 to move up in response to the pressure of the spring 25, thereby increasing the distance between the poppet seat 15 and orifice 5. Consequently, the differential pressure created across the orifice 5 is decreased, thereby increasing the Threshold Rate at which the valve system will shut down the flow of fluid or gas. On the other hand, the displacement of cam 37 towards the sealing cap 45 causes the poppet 11 to move down, thereby decreasing the distance between the poppet seat 15 and orifice 5. Consequently, the differential pressure created across the orifice 5 is increased, thereby decreasing the Threshold Rate. (Of course, the ramping structure of the inclined plane 60 could also be reversed, so that movement towards the sealing cap 45 would increase rather than decrease the Threshold Rate). With this unique design, the valve system can be set to virtually any Threshold Rate.

In practice, the valve system may be used to regulate the flow of gas into a house from an outside gas source. The maximum gas consumption rate (the rate at which all gas-consuming equipment are turned on) for the house is first determined. Then, the Threshold Rate is set to a desired level, e.g., about 10% higher than the maximum consumption rate. This is preferably done by a professional using a flowmeter. Hence, if the maximum consumption rate is determined to be 100,000 BTUs (British Thermal Units), then the Threshold Rate is set at around 110,000 BTUs by adjusting a pre-calibrated threaded member 31. If the flow rate exceeds the set Threshold Rate, the poppet moves against the spring 25 and toward the orifice 5, such that the poppet seat 15 presses against the receiving portion 8, causing the valve system to shut down the supply of gas into the house, thereby avoiding a potential catastrophic event. Using the design of the present invention, the valve system can be set to any Threshold Rate with virtually an infinite degree of adjustability.

FIG. 2 shows a cross-sectional view of an exemplary configuration of the excess flow valve system used in its open position and FIG. 3 shows the same valve from a direction normal to the cross-section of FIG. 2 in its closed position. As it slides up or down, the poppet 11 is guided by the two or more guiding fins 16 and/or support arms 19. The support arms 19 on the poppet top 14 ensure that the poppet slides longitudinally inside the housing body 1 during its up and down motion. The support arms 19 also help to stabilize the poppet during adjustments. Also, because too much lateral pressure on the poppet top 14 can cause the support arms 19 to bind with the chamber 4 wall, when setting the valve care should be taken to release the poppet by reversing the threaded member 31 slightly before the final setting is made. The poppet 11 is urged against the cam 37, as shown in FIG. 2, which retains the poppet's upward movement within the chamber 4, and, when the Threshold Rate is exceeded, the poppet 11 quickly slides away from the cam 37 and toward the orifice 5, such that the poppet seat 15 seals the valve, as shown in FIG. 3.

With respect to FIGS. 9–14, the present valve system can be employed to significantly widen the range of potential threshold flow rates. For example, in one embodiment that has been tested and developed, the range of threshold flow rates for natural gas can be extended from between about 30,000 BTU's to about 1.5 million BTU's. The following shows the possible ranges that can be achieved with a single valve housing body, using various size spacers, poppets and multiple-phase settings. In each of these samples, a single spring with a pre-calibrated tension is used, with a three-phase housing body 1, along with an adjustment mechanism with the engagement surfaces at 45 degrees. In each case, precise adjustments that are substantially infinitely variable within the operating ranges can be made without having to replace the spring, change the size of the orifice, or the like.

Assembly No. 1: The assembly shown in FIG. 9 employs a standard size poppet 11 with the threaded member 31 in the upper position 63. The operating range using the adjustment mechanism of the present invention for this assembly is about 31,000 to 593,000 BTU's for natural gas, and about 47,000 to 944,000 BTU's for liquid petroleum.

Assembly No. 2: The assembly shown in FIG. 10 employs a standard size poppet 11 with one spacer 61 (having 0.300 inch width) and threaded member 31 in the upper position 63. The operating range using the adjustment mechanism of the present invention for this assembly is about 39,000 to 916,000 BTU's for natural gas, and about 61,000 to 1,457,000 BTU's for liquid petroleum.

Assembly No. 3: The assembly shown in FIG. 11 employs a standard size poppet 11 with two spacers 59 and 61 (having 0.200 and 0.300 inch widths, respectively) and threaded member 31 in the upper position 63. The operating range using the adjustment mechanism of the present invention for this assembly is about 52,000 to 793,000 BTU's for natural gas, and about 82,000 to 1,262,000 BTU's for liquid petroleum.

Assembly No. 4: The assembly shown in FIG. 12 employs a shorter poppet 69 with threaded member 31 in the middle position 64. The operating range using the adjustment mechanism of the present invention for this assembly is about 75,000 to 980,000 BTU's for natural gas, and about 119,000 to 1,561,000 BTU's for liquid petroleum.

Assembly No. 5: The assembly shown in FIG. 13 employs a shorter poppet 69 with one spacer 57 (having 0.100 inch width) and threaded member 31 in the middle position 64. The operating range using the adjustment mechanism of the present invention for this assembly is about 36,000 to 877,000 BTU's for natural gas, and about 57,000 to 1,395,000 BTU's for liquid petroleum.

Assembly No. 6: The assembly shown in FIG. 14 employs a shorter poppet 69 with threaded member 31 in the bottom position 65. The operating range using the adjustment mechanism of the present invention for this assembly is about 54,000 to 851,000 BTU's for natural gas, and about 86,000 to 1,354,000 BTU's for liquid petroleum.

With the valve system assemblies described above, the range of Threshold Rates is likely to be sufficient for most applications where natural gas or liquid petroleum gas is used. Accordingly, a single valve system where the settings can be adjusted on-site within a wide range, without having to change the size of the housing body 1, the size of the orifice 5, or the tension on the spring 25, can be applied in a variety of applications where the fluid or gas supply pressures vary. The settings are also capable of being reset and repeated because the engagement surfaces typically wear evenly. And, where other applications might require a different range of Threshold Rates, it should be understood that the above threshold ranges can be varied further by changing the position of the threaded member 31, the length of the poppet 11, and/or the size and number of the spacers. The range of motion of the adjustment mechanism can also be adjusted, if desired.

Rather than having to replace the spring or change the orifice size to adjust the Threshold Rate as in standard valves, one or more of the adjustment steps discussed above can be employed. For example, using a single valve housing body, one or more spacers can be added to adjust the effective tension of the spring for any given setting to change the range of possible Threshold Rates. The multiple-phase settings can also be used to widen the range of Threshold Rates that are possible for any given size of housing body. Moreover, the poppet itself can be changed to adjust the travel distance of the poppet and therefore the Threshold Rate. The valve is then set using the adjustment mechanism to the precise Threshold Rate by turning the threaded member 31 to a predetermined position, i.e., to a specific BTU level.

Tests have also been conducted using flowmeters that show the sensitivity of the adjustment mechanism settings. For example, a pipe system with about 54 feet of ¾ inch pipe with an inlet supplying air, simulating natural gas, under constant pressure at one end and a drill cap at the other end was tested. The system was designed to simulate conditions where low pressure exists at the far end of the system away from the inlet. With the valve Threshold Rate set at approximately 64,000 BTU's for natural gas (or 50 SCFH), the valve that was tested shut down when a hole with a diameter of 0.1250 inches was drilled in the drill cap. And, when the Threshold Rate was set at approximately 128,000 BTU's for natural gas (or 100 SCFH), the valve shut down when a hole with a diameter of 0.1719 inches was drilled in the drill cap. Because the pressure in the system is higher at the inlet end than at the far end, when a hole is drilled closer to the inlet end, such as within about 10 feet, the valve typically shuts off when the hole is smaller, i.e., half the size as the one drilled at the far end. With the ability to set the valve to precise Threshold Rates, the present valve is able to detect small as well as large leaks without confusing small leaks with pilot light outages, or large leaks with all of the appliances being turned on, i.e., maximum consumption.

While the present invention has been described in detail above, it should be understood that it is not limited to the specific embodiments shown and described herein. The present invention contemplates that embodiments not specifically described or shown are within its scope, and that its scope is defined only by the claims that follow.

What is claimed is:

1. A valve, comprising:
   an outer housing having a chamber extending in a longitudinal direction, said housing having an orifice located at one end of said chamber;
   a poppet within said chamber movable in said longitudinal direction between an open and closed position, said poppet being adapted to seal said orifice in said closed position;
   a spring member for urging said poppet in said longitudinal direction away from said orifice to said open position;
   an externally adjustable threaded member extending through said housing and into said chamber;
   a retainer for restricting the movement of said poppet in relation to said orifice in said longitudinal direction, said retainer being associated with said threaded member such that turning said threaded member causes a first angled surface on said retainer to move longitudinally relative to said threaded member and laterally relative to said chamber;
   a second angled surface located on said poppet which is urged by said spring member substantially toward said first angled surface, wherein said first and second angled surfaces are adapted to engage one another and slide with respect to one another along substantially the same plane; and
   wherein by externally turning the threaded member, the retainer can be moved longitudinally in relation to said threaded member, and laterally in relation to said chamber, and the location of said first angled surface can be adjusted and set to a predetermined position, wherein the position of said first angled surface determines the maximum travel distance of said poppet in said longitudinal direction, whereby said position of said first angled surface helps determine the threshold flow rate of said valve.

2. The valve of claim 1, wherein the valve is adapted so that the rotation of the poppet in relation to the retainer is substantially limited by one or more guides, wherein the first and second angled surfaces are adapted to engage one another and slide relative to one another substantially unidirectionally.

3. The valve of claim 1, wherein the spring member substantially urges said second angled surface against said first angled surface such that they are in substantial contact with each other, wherein turning the threaded member causes the first angled surface to slide relative to said second angled surface, causing said poppet to move either toward or away from said orifice.

4. The valve of claim 1, wherein the threaded member is substantially fixed in relation to said housing in all directions except rotationally, wherein at least a portion of the threaded member is substantially located within said chamber, said threaded member having a head which can be accessed from the exterior of said housing, such that the threaded member can be externally adjusted.

5. The valve of claim 4, wherein a break-away plug is provided to prevent the head of said threaded member from being turned once the threaded member is set.

6. The valve of claim 1, wherein the poppet is provided with one or more support arms to help support the poppet laterally within said chamber, said support arms being adapted to allow the poppet to move freely in said longitudinal direction within said chamber.

7. The valve of claim 1, wherein one or more spacers are provided within said chamber to adjust the tension of said spring member and change the threshold flow rate of said valve, wherein said one or more spacers are used to adjust the distance the spring member must be compressed to move the poppet to the closed position for any given maximum travel distance of said poppet.

8. The valve of claim 1, wherein said housing is provided with multiple settings on which the threaded member can be positioned, wherein each of said settings is located on said housing at a predetermined distance from said orifice, wherein by changing and positioning said threaded member on a particular setting, the range of the threshold flow rates can be adjusted.

9. The valve of claim 8, wherein each of said multiple settings comprises an opening on one side of the housing and a notch on the other side, wherein the threaded member can be inserted through said opening and extended across the chamber into said notch on the other side, wherein the threaded member is held within said housing in all directions except rotationally, and is oriented laterally within said chamber.

10. The valve of claim 1, wherein the retainer is movable in relation to said threaded member between a first and second position corresponding to minimum and maximum settings on said threaded member, wherein the position of said retainer in relation to said threaded member can be accurately controlled by said threaded member.

11. A valve comprising:
a body having a chamber and an orifice located at one end of said chamber;
a poppet within said chamber movable between an open and closed position and adapted to seal said orifice;
a spring member for urging said poppet away from said orifice to said open position; and
an adjustment mechanism comprising an externally adjustable member and cam movably associated therewith, wherein said cam moves in relation to said externally adjustable member and can be used to set the maximum travel distance of said poppet in relation to said orifice, wherein the position of said cam on said member determines the threshold flow rate of said valve.

12. The valve of claim 11, wherein said externally adjustable member is threaded and extends laterally within said chamber, wherein said cam is threadably associated with said externally adjustable member such that by turning said member, said cam is moved longitudinally along said member and laterally within said chamber.

13. The valve of claim 12, wherein the cam has thereon a first angled surface which is adapted to engage a second angled surface on said poppet, said second angled surface being urged toward said first angled surface by said spring member, wherein moving said cam longitudinally along said member in one direction causes said first and second angled surfaces to slide in relation to one another, and said second angled surface to move in a second direction, wherein the poppet is moved either toward or away from said orifice.

14. The valve of claim 13, wherein the cam and/or poppet is adapted with one or more guides such that the rotation of said poppet in relation to said cam is substantially restricted, such that when said externally adjustable member is turned, and the cam is moved longitudinally along said member, said first and second angled surfaces slide in relation to one another along substantially the same plane and substantially unidirectionally.

15. The valve of claim 11, wherein said externally adjustable member is substantially fixed within said chamber except in the rotational direction, wherein turning the externally adjustable member causes said cam associated therewith to move longitudinally in relation to said member.

16. A method of adjusting the threshold flow rate of a gas or fluid flow system containing natural gas, liquid petroleum, or the like, under pressure, comprising:
installing a valve with a poppet and orifice on said fluid flow system, said valve having an adjustment mechanism comprising an externally adjustable member and a cam movably associated therewith;
determining the threshold flow rate of said fluid flow system;
setting the threshold flow rate of said valve by adjusting said externally adjustable member and causing said cam to move in relation thereto, wherein said cam moves in relation to said externally adjustable member and can be used to determine the maximum travel distance of said poppet in relation to said orifice.

17. The method of claim 16, wherein the step of installing a valve on said fluid flow system comprises the additional step of providing a first angled surface on said cam and a second angled surface on said poppet, wherein said first and second angled surfaces engage one another to determine the maximum travel distance of said poppet in relation to said orifice.

18. The method of claim 17, wherein the method comprises the additional step of limiting the rotational movement of said poppet in relation to said cam, wherein the rotational orientation of said first angled surface in relation to said second angled surface is maintained substantially constant.

19. The method of claim 17, wherein the step of setting the maximum travel distance of said poppet in relation to said orifice comprises turning said externally adjustable member and causing said cam to move longitudinally thereon in a first direction, wherein moving said cam in said first direction causes said first and second angled surfaces to slide in relation to one another, and said poppet, which is urged toward said cam by a spring, to move in a second direction, either toward or away from said orifice.

20. The method of claim 19, wherein the step of setting the threshold flow rate enables the valve to close when the threshold flow rate in said system is exceeded, wherein said threshold flow rate is exceeded when the pressure differential between the upstream and downstream portions of said system is great enough to cause said poppet to overcome the pressure of said spring urging said poppet toward said cam and cause said poppet to slide toward and against said orifice.

21. The method of claim 16, wherein the step of determining the threshold flow rate of said fluid flow system comprises the step of determining the maximum consumption rate of said fluid flow system and adding a predetermined amount to said maximum consumption rate.

22. The method of claim 21, wherein said predetermined amount that is added to said maximum consumption rate is about 10 percent of the maximum consumption rate.

23. The method of claim 16, wherein the method comprises the additional step of providing a plurality of settings on said valve and positioning said externally adjustable member on one of said settings, wherein the range of possible threshold flow rates can be adjusted thereby.

24. The method of claim 16, wherein the method comprises the additional step of providing a spring that urges said poppet away from said orifice to an open position, and of providing one or more spacers which can, for any given maximum travel distance of said poppet, be used to adjust the tension of said spring, wherein said one or more spacers can be used to adjust the amount the spring must be compressed to cause the poppet to be moved to a closed position.

25. The method of claim 16, wherein the method comprises the additional step of selecting a poppet having a predetermined length, wherein the length of said poppet can be used to adjust the range of possible threshold flow rates that can be employed by said method.

26. A valve, comprising:
a body having a chamber and an orifice;
a poppet within said chamber movable between an open and closed position, said poppet being adapted to seal said orifice in said closed position and having a first sliding surface thereon;
a spring for urging said poppet away from said orifice to said open position;
an adjustment mechanism comprising an externally adjustable member and a second sliding surface extending therefrom, wherein said first and second sliding surfaces are adapted to engage one another to set the maximum travel distance of said poppet in relation to said orifice, wherein the position of said second sliding surface in relation to said first sliding surface helps determine the threshold flow rate of said valve; and a guide for limiting the rotation of said poppet in relation to said adjustment mechanism such that the rotational orientation of said first sliding surface in relation to said second sliding surface can be maintained substantially constant.

27. The valve of claim 26, wherein when said first and second sliding surfaces are engaged with one another, said sliding surfaces extend along substantially the same angled plane.

28. The valve of claim 26, wherein said guide is comprised of two or more guide surfaces extending on either side of said first and/or second sliding surfaces, wherein the distance between said two or more guide surfaces is only slightly greater than the width of said first and/or second sliding surfaces, such that the guide surfaces limit the extent to which said first sliding surface and said second sliding surface can rotate with respect to one another.

29. The valve of claim 28, wherein by limiting the relative rotational movement of said first and second sliding surfaces, said first and second sliding surfaces are maintained substantially parallel to one another and slide relative to one another substantially uni-directionally along substantially the same plane during adjustments.

30. The valve of claim 26, wherein support arms are extended from said poppet outward toward the chamber wall to stabilize said poppet during adjustments and to help support said poppet during longitudinal movement of said poppet in said chamber.

31. The valve of claim 26, wherein said externally adjustable member comprises a threaded portion that extends into said chamber, wherein a cam with said second sliding surface thereon having a threaded bore is associated with said threaded portion such that by turning said externally adjustable member said cam is moved longitudinally along said threaded portion, causing said second sliding surface to move in one direction, and said first and second sliding surfaces to slide in relation to one another, wherein said first sliding surface is moved in a second direction, either toward or away from said orifice.

* * * * *

UNITED STATES PATENT AND TRADEMARK OFFICE
CERTIFICATE OF CORRECTION

PATENT NO. : 6,019,115
DATED : Feb. 1, 2000
INVENTOR(S) : R. Gene Sanders

It is certified that error appears in the above-indentified patent and that said Letters Patent is hereby corrected as shown below:

On the title page insert item [60],

The present application claims the benefit of the filing dates of U.S. Provisional Application Serial No. 60/047,457, filed on May 22, 1997, and U.S. Provisional Application Serial No. 60/042,596, filed on April 1, 1997.

Signed and Sealed this

Third Day of April, 2001

Attest:

NICHOLAS P. GODICI

*Attesting Officer*    *Acting Director of the United States Patent and Trademark Office*